(12) United States Patent
Zhen et al.

(10) Patent No.: US 8,238,096 B2
(45) Date of Patent: Aug. 7, 2012

(54) MOUNTING STRUCTURE FOR ELECTRONIC DEVICE

(75) Inventors: Guang-Xing Zhen, Shenzhen (CN); Qing-Hui Mi, Shenzhen (CN); Hsin-Hung Lee, Taipei Hsien (TW); Ming-Hui Tsai, Taipei Hsien (TW); Guang-Yao Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 434 days.

(21) Appl. No.: 12/551,457

(22) Filed: Aug. 31, 2009

(65) Prior Publication Data

US 2010/0302723 A1 Dec. 2, 2010

(30) Foreign Application Priority Data

May 31, 2009 (CN) .......................... 2009 1 0302776

(51) Int. Cl.
*G06F 1/16* (2006.01)
(52) U.S. Cl. .............. 361/679.58; 361/679.33; 361/726; 312/223.1; 312/223.2
(58) Field of Classification Search ............. 361/679.58, 361/726
See application file for complete search history.

(56) References Cited

U.S. PATENT DOCUMENTS

| | | | | |
|---|---|---|---|---|
| 5,136,468 A | * | 8/1992 | Wong et al. | 361/679.6 |
| 5,306,079 A | * | 4/1994 | Liu | 312/223.2 |
| 5,940,265 A | * | 8/1999 | Ho | 361/679.31 |
| 6,885,551 B2 | * | 4/2005 | Chen | 361/679.33 |
| 6,999,308 B2 | * | 2/2006 | Hsu | 361/679.33 |
| 7,204,469 B2 | * | 4/2007 | Chen et al. | 248/694 |
| 7,359,187 B2 | * | 4/2008 | Hu et al. | 361/679.33 |
| 7,430,115 B2 | * | 9/2008 | Liu et al. | 361/679.33 |
| 7,433,183 B2 | * | 10/2008 | Huang | 361/679.33 |
| 7,609,508 B2 | * | 10/2009 | Chen et al. | 361/679.33 |
| 2006/0126288 A1 | * | 6/2006 | Chen et al. | 361/685 |
| 2007/0002532 A1 | * | 1/2007 | Chen et al. | 361/685 |

* cited by examiner

*Primary Examiner* — Anthony Q Edwards
(74) *Attorney, Agent, or Firm* — Altis Law Group, Inc.

(57) ABSTRACT

An mounting structure includes an enclosure, a bracket, a latching member, and an elastic member. The enclosure includes opposite first and second sidewalls. An insert hole is defined in each of the first and second sidewalls. A latching hole is defined in the first sidewall. The bracket to receive an electronic device includes opposite first and second sides. An insert extends from each of the first and second sides. The inserts can be inserted in the insert holes. The latching member is rotatably mounted to the bracket. The latching member includes a main body, and a latching pole extending from the main body. The elastic member can bias the latching member to rotate to a latching position in which the latching pole is inserted in the latching hole of the enclosure.

16 Claims, 4 Drawing Sheets

MOUNTING STRUCTURE FOR ELECTRONIC DEVICE

BACKGROUND

1. Technical Field

The present disclosure relates to a mounting structure for an electronic device.

2. Description of Related Art

A computer includes many electronic devices, such as hard disk drives and optical disk drives, which are installed in a computer enclosure. Typically, when an electronic device is installed or uninstalled, the operation is done in a narrow space in the computer enclosure, which is inconvenient and not fit for assembly lines.

DETAILED DESCRIPTION

Figure 1:
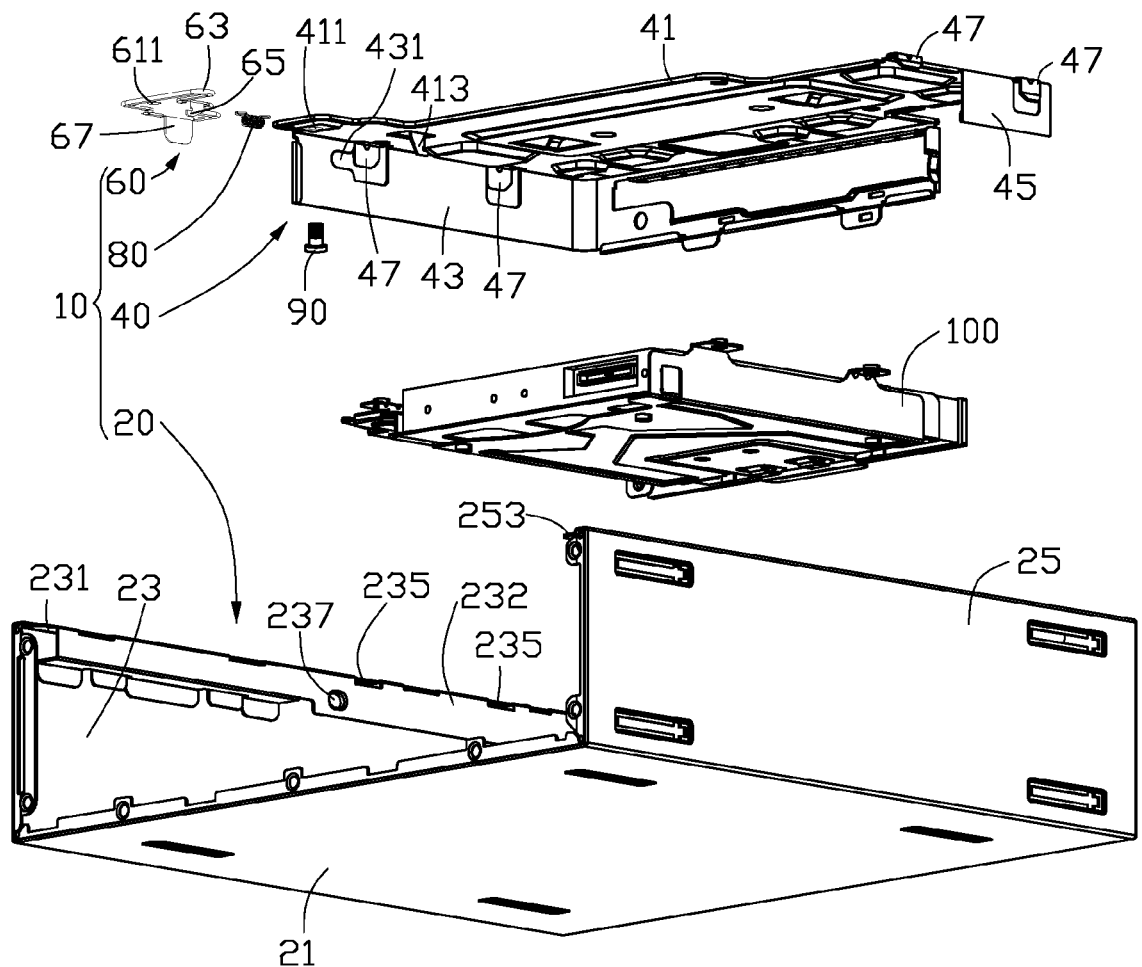
FIG. 1 is an exploded, isometric view of a first embodiment of an mounting structure for an electronic device, the mounting structure including a latching member.

Referring to FIG. 1, an embodiment of an mounting structure 10 for installing an electronic device 100, such as a hard disk drive or an optical disk drive, includes an enclosure 20, a bracket 40, a latching member 60, and an elastic member 80.

The enclosure 20 is generally U-shaped and includes a bottom wall 21, a first sidewall 23 perpendicularly extending upward from a first side of the bottom wall 21, and a second sidewall 25 perpendicularly extending upward from a second side opposite to the first side of the bottom wall 21. An elongated first bent portion 231 perpendicularly extends from a top of the first sidewall 23 towards the second sidewall 25. An elongated second bent portion 253 perpendicularly extends from a top of the second sidewall 25 towards the first sidewall 23. Each of the first bent portion 231 and the second bent portion 253 defines a plurality of insert holes 235 (also see FIG. 3). An elongated third bent portion 232 perpendicularly extends downward from a distal side opposite to the first sidewall 23 of the first bent portion 231. An oblate latching hole 237 is defined in the third bent portion 232.

The bracket 40 is used to mount the electronic device 100. The bracket 40 includes a base board 41, a first side board 43 perpendicularly extending downward from a first side of the base board 41, and a second side board 45 perpendicularly extending downward from a second side opposite to the first side of the base board 41. A through hole 431 is defined in the first side board 43. A plurality of inserts 47 corresponding to the plurality of insert holes 235 of the enclosure 20 extends downward from the first and second sides of the base board 41, parallel with and outside the corresponding one of the first side board 43 and the second side board 45. A screw hole 411 is defined in the base board 41, adjacent to an end of the base board 41 and the through hole 431 of the first side board 43. A first hook 413 extends downward from the base board 41, adjacent to the through hole 431 and the screw hole 411.

Figure 2:
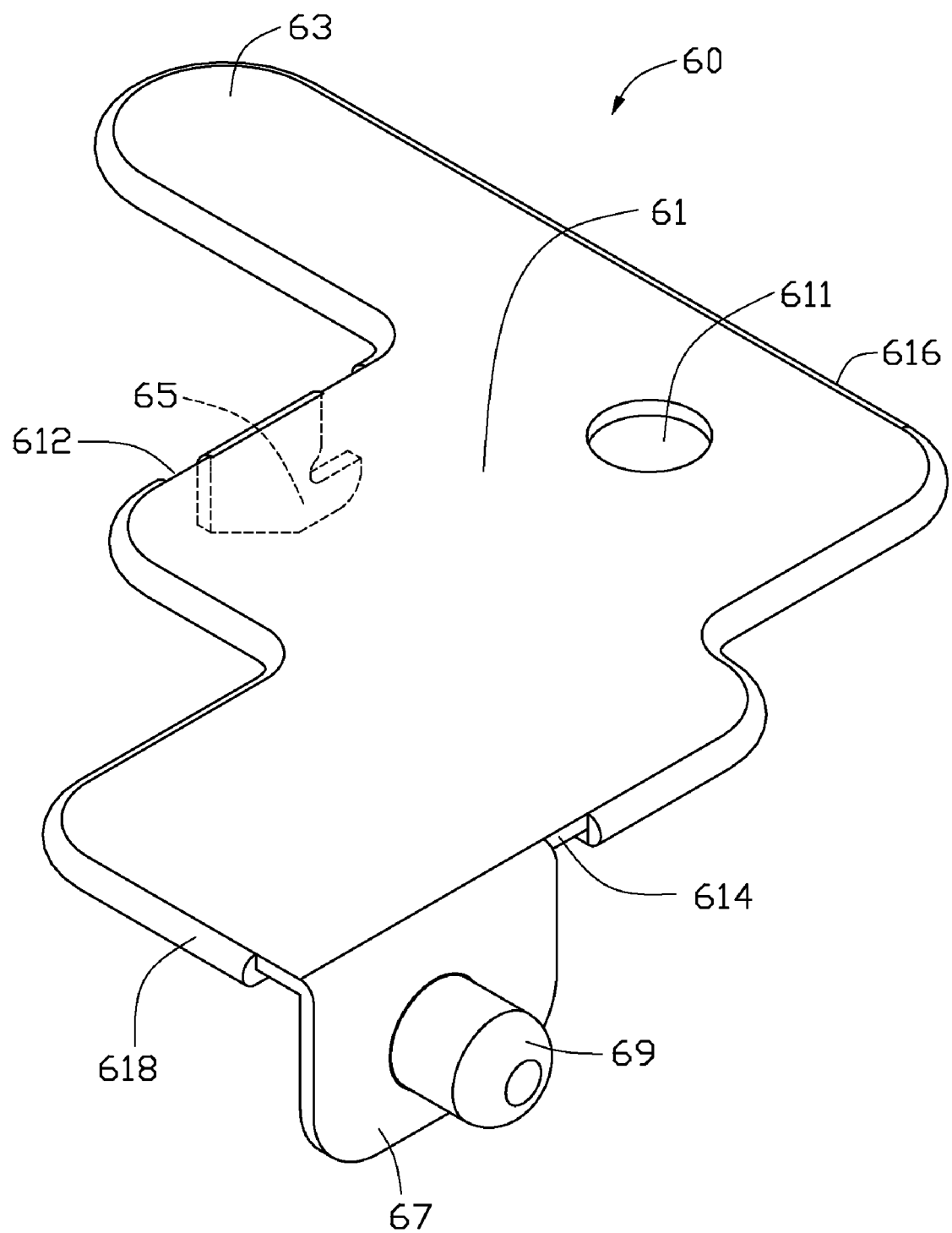
FIG. 2 is an enlarged, isometric view of the latching member in FIG. 1, but viewed from another perspective.

Referring to FIG. 2, the latching member 60 includes a flat main body 61. The main body 61 includes opposite first and second sides 612 and 614, and opposite first and second ends 616 and 618. A handle 63 extends flatly from the first side 612 of the main body 61, adjacent to the first end 616 of the main body 61. A generally L-shaped second hook 65 extends downward from a middle of the first side 612 of the main body 61. A latching piece 67 perpendicularly extends downward from the second side 614 of the main body 61, adjacent to the second end 618 of the main body 61. A cylinder-shaped latching pole 69 perpendicularly extends from the latching piece 67, away from the main body 61. A pivot hole 611 is defined in the main body 61, adjacent to the first end 616.

In one embodiment, the elastic member 80 is a pullback spring.

Figure 3:
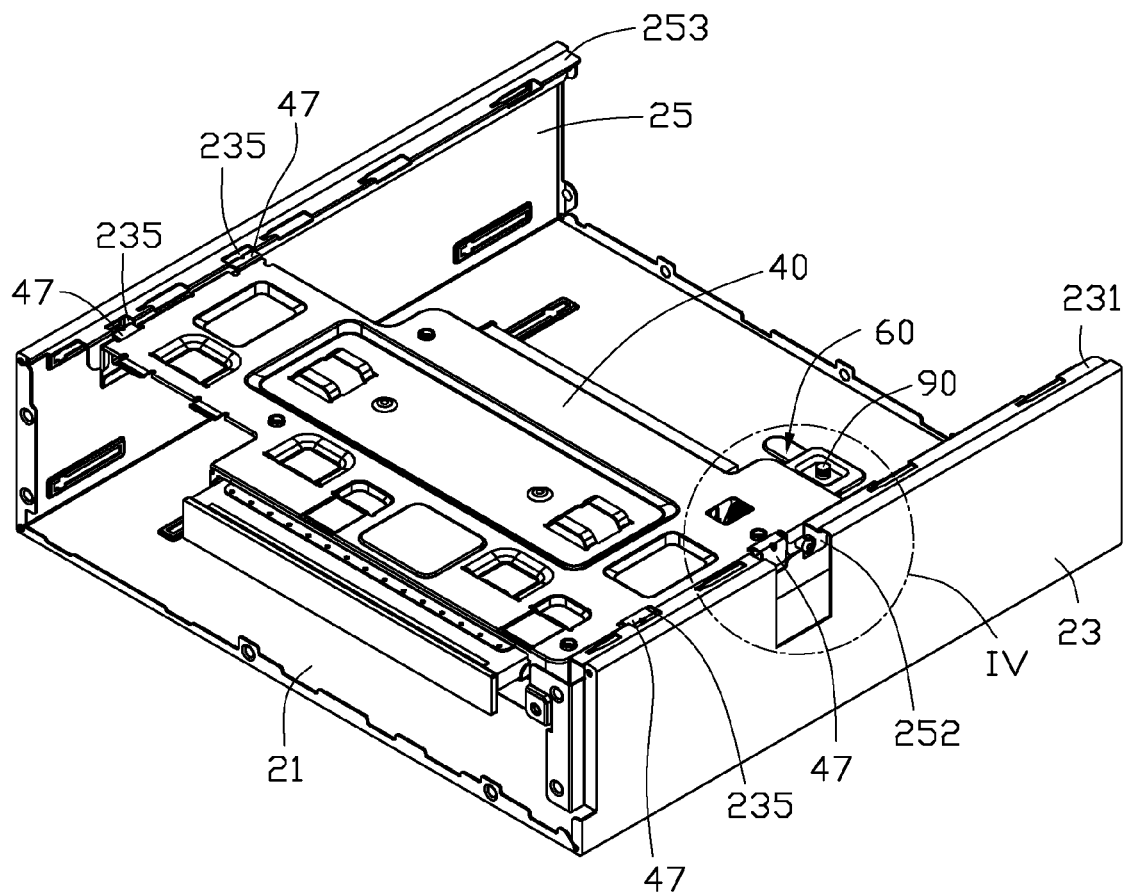
FIG. 3 is an assembled, isometric view of the mounting structure of FIG. 1, but viewed from another perspective.
Figure 4:
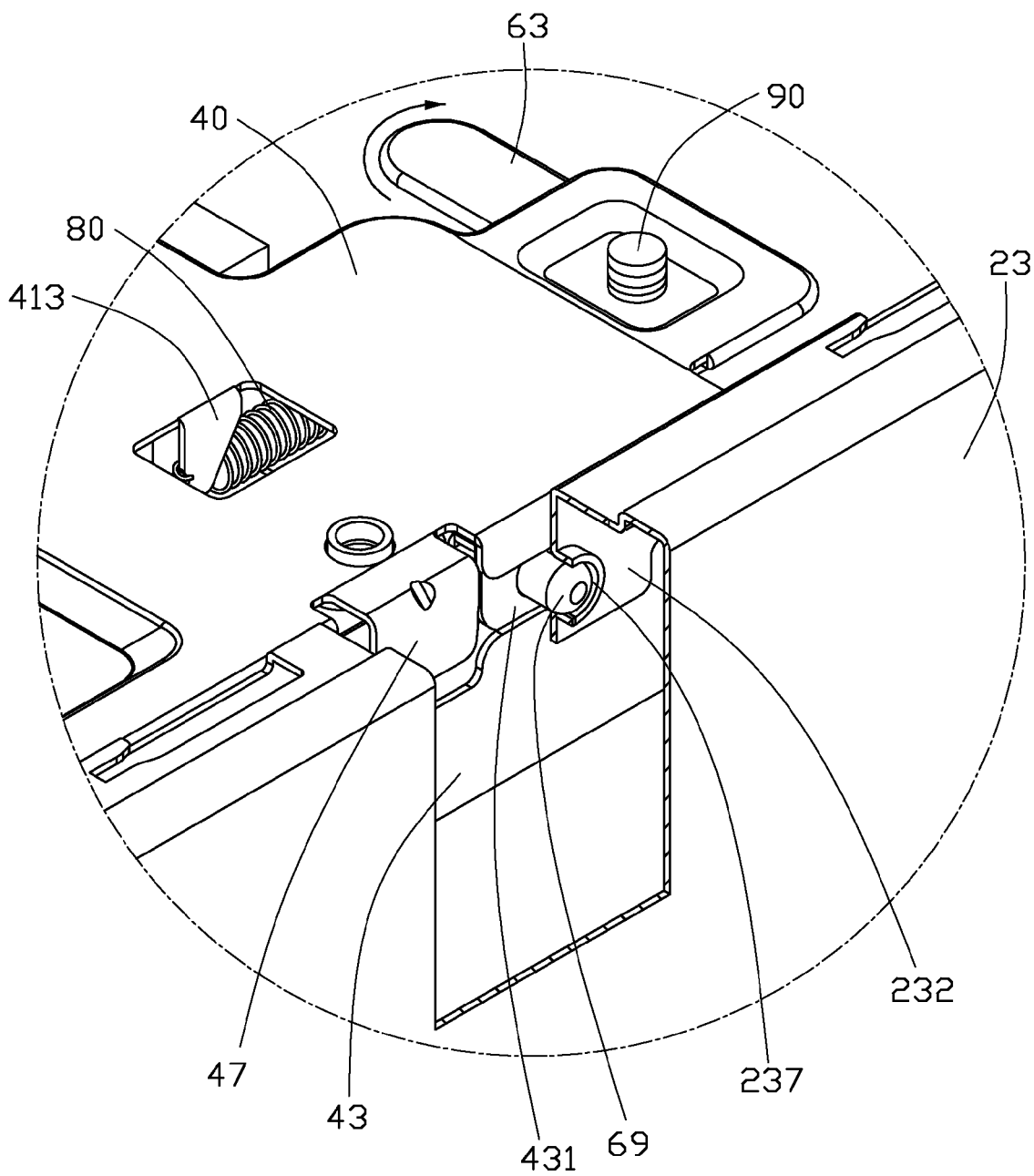
FIG. 4 is an enlarged view of the circled portion IV of FIG. 3.

Referring to FIGS. 3 and 4, in assembly, the electronic device 100 is mounted to the bracket 40. A screw 90 including a threaded portion and a smooth portion, is used to rotatably mounted the latching member 60 to the bracket 40, wherein the threaded portion of the screw 90 is extended through the pivot hole 611 of the latching member 60 and engaged in the screw hole 411 of the bracket 40, while the smooth portion of the screw 90 is received in the pivot hole 611 of the latching member 60 and functions as a pivot. Two ends of the elastic member 80 are respectively caught by the first hook 413 of the bracket 40 and the second hook 65 of the latching member 60. The inserts 47 of the bracket 40 are inserted into the corresponding insert holes 235 of the enclosure 20, to mount the bracket 40 to the enclosure 20. The elastic member 80 biases the latching pole 69 of the latching member 60 to rotate to a latching position in which the latching pole 69 extends through the through hole 431 of the bracket 40 and is received in the latching hole 237 of the enclosure 20. Therefore, the electronic device 100 is installed in the enclosure 20 with the bracket 40, avoiding having to install the electronic device 100 in a narrow space in the enclosure 20.

When the electronic device 100 needs to be uninstalled from the enclosure 20, the handle 63 of the latching member 60 is operated to rotate the latching pole 69 of the latching member 60 away from the latching hole 237 of the enclosure 20. Then the bracket 40 is manually raised to disengage the plurality of inserts 47 of the bracket 40 from the corresponding insert holes 235 of the enclosure 20. Therefore, the electronic device 100 is uninstalled from the enclosure 20 with the bracket 40 and ready to be disassembled from the bracket 40 outside the enclosure 20, avoiding having to uninstall the electronic device 100 in the narrow space in the enclosure 20.

In other embodiments, placements of the latching pole 69 of the latching member 60 and the latching hole 237 of the enclosure 20 may be exchanged with each other. Also, arrangements of the plurality of inserts 47 of the bracket 40 and the corresponding insert holes 235 of the enclosure 20 may also be exchanged with each other.

In other embodiments, the elastic member 80 may be a pressure spring or any other spring, which can be used to bias the latching pole 69 of the latching member 60 to rotate to the latching position.

In other embodiments, only one insert hole 235 may be defined in each of the first bent portion 231 and the second bent portion 253 of the enclosure 20, and the quantity of the inserts 47 of the bracket 40 are correspondingly adjusted.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting structure for installing an electronic device, comprising:
   an enclosure comprising opposite first and second sidewalls, wherein an insert hole is defined in each of the first and second sidewalls, and a latching hole is defined in the first sidewall;
   a bracket received in the enclosure to receive the electronic device, the bracket comprising opposite first and second side boards corresponding to the first and second sidewalls of the enclosure, wherein an insert extends from each of the first and second side boards to be inserted in the corresponding insert hole of the enclosure;
   a latching member rotatably mounted to the bracket, wherein the latching member comprises a main body, and a latching pole extending from the main body to be inserted in the latching hole of the enclosure; and
   an elastic member connected between the bracket and the latching member to bias the latching pole of the latching member to rotate to a latching position in which the latching pole is inserted in the latching hole of the enclosure, wherein when the latching member is rotated away from the latching position, the elastic member is deformed to allow the latching pole of the latching member to move away from the first sidewall and disengage from the latching hole.

2. The mounting structure of claim 1, wherein the elastic member is a pullback spring, a first hook extends from the bracket, a second hook extends from the main body of the latching member, and two ends of the elastic member are respectively caught by the first hook and the second hook.

3. The mounting structure of claim 2, wherein a handle extends from the main body of the latching member for facilitating rotating the latching member.

4. The mounting structure of claim 3, wherein a pivot hole is defined in the main body of the latching member, the bracket further comprises a base board perpendicularly connected between tops of the first and second side boards, a screw hole is defined in the base board of the bracket, and a screw is inserted through the pivot hole and engaged in the screw hole for the latching member to rotate about the screw.

5. The mounting structure of claim 4, wherein the main body of the latching member is flat and comprises opposite first and second sides, and opposite first and second ends, wherein the handle extends from the first side and adjacent to the first end, the second hook extends from a middle of the first side, the latching pole extends from a latching piece which extends from the second side and adjacent to the second end, and the pivot hole is defined in the main body adjacent to the first end.

6. The mounting structure of claim 1, wherein the latching pole is cylinder-shaped, and the latching hole is oblate.

7. The mounting structure of claim 1, wherein a first bent portion perpendicularly extends from the first sidewall, a second bent portion perpendicularly extends from the second sidewall, the insert holes are respectively defined in the first bent portion and the second bent portion.

8. The mounting structure of claim 7, wherein a third bent portion perpendicularly extends from the first bent portion, and the latching hole is defined in the third bent portion.

9. The mounting structure of claim 1, wherein, the first side board and the second side board are located between the inserts, and a through hole is defined in the first side board for the latching pole to extend through when the latching pole is in the latching position.

10. A mounting structure for installing an electronic device, comprising:
    an enclosure comprising opposite first and second sidewalls;
    a bracket received in the enclosure to accommodate the electronic device; and
    a latching member rotatably mounted to the bracket;
    wherein a first insert hole is defined in one of the first sidewall and the bracket, and a first insert extends from the other one of the first sidewall and the bracket to be inserted in the first insert hole;
    wherein a second insert hole is defined in one of the second sidewall and the bracket, and a second insert extends from the other one of the second sidewall and the bracket to be inserted in the second insert hole;
    wherein a latching hole is defined in one of the first sidewall and the latching member, and a latching pole extends from the other one of the first sidewall and the latching member to be inserted in the latching hole; and
    wherein an elastic member is connected between the latching member and the bracket, to bias the latching member to rotate to a latching position in which the latching pole is inserted in the latching hole, and wherein when the latching member is rotated away from the latching position, the elastic member is deformed to allow the latching pole to disengage from the latching hole.

11. The mounting structure of claim 10, wherein the elastic member is a pullback spring, a first hook extends from the bracket, a second hook extends from the latching member, and two ends of the elastic member are respectively caught by the first hook and the second hook.

12. The mounting structure of claim 10, wherein a handle extends from the latching member for facilitating rotating the latching member.

13. The mounting structure of claim 10, wherein a pivot hole is defined in the latching member, a screw hole is defined in the bracket, and a screw is inserted through the pivot hole and engaged in the screw hole for the latching member to rotate about the screw.

14. An assembly comprising:
    a generally U-shaped enclosure;
    a bracket detachably mounted in the enclosure;
    an electronic device detachably mounted to the bracket; and
    a latching member rotatably mounted to the bracket;
    wherein a latching hole is defined in one of the enclosure and the latching member, and a latching pole extends from the other one of the enclosure and the latching member to be inserted in the latching hole; and
    wherein an elastic member is connected between the latching member and the bracket, to bias the latching member to rotate to a latching position in which the latching pole is inserted in the latching hole, and wherein when the latching member is rotated away from the latching portion, the elastic member is deformed to allow the latching pole to disengage from the latching hole.

15. The assembly of claim 14, wherein an insert hole is defined in one of the enclosure and the bracket, and an insert extends from the other one of the enclosure and the bracket to be inserted in the insert hole.

16. The assembly of claim 14, wherein the electronic device is an optical click drive.

* * * * *